United States Patent [19]

Etkin

[11] Patent Number: 5,085,174
[45] Date of Patent: Feb. 4, 1992

[54] PET TRAINER

[75] Inventor: Norm Etkin, San Diego, Calif.

[73] Assignee: Beverly L. Sokolis, San Diego, Calif.; a part interest

[21] Appl. No.: 603,384

[22] Filed: Oct. 26, 1990

[51] Int. Cl.⁵ .............................................. A01K 29/00
[52] U.S. Cl. .................................................... 119/169
[58] Field of Search ............... 119/165, 168, 169, 170, 119/29

[56] References Cited

U.S. PATENT DOCUMENTS

| 1,773,141 | 8/1930 | Hodgson | 119/165 X |
| 3,486,485 | 12/1969 | Kahanick | 119/29 |
| 3,752,121 | 8/1973 | Brazzell | 119/169 |
| 3,993,027 | 11/1976 | Mullin | 119/29 |
| 4,047,499 | 9/1977 | Janecek | 119/168 |
| 4,147,129 | 4/1979 | Ruplen | 119/169 X |

FOREIGN PATENT DOCUMENTS

| 2419015 | 10/1979 | France | 119/165 |
| 2599585 | 12/1987 | France | 119/169 |

Primary Examiner—Gene Mancene
Assistant Examiner—R. Thomas Price
Attorney, Agent, or Firm—Ralph Branscomb

[57] ABSTRACT

A trainer designed primarily for dogs but no doubt useful for other small pets has a wide panel surrounded by a continuous peripheral lip which seats one or more layers of newspaper. A pet tether connected centrally of the panel is attached at its distal end to the collar of the pet, preventing the pet from escaping beyond the confines of the panel so that the pet develops the habit of relieving itself on the newspapers in the pet trainer.

5 Claims, 1 Drawing Sheet

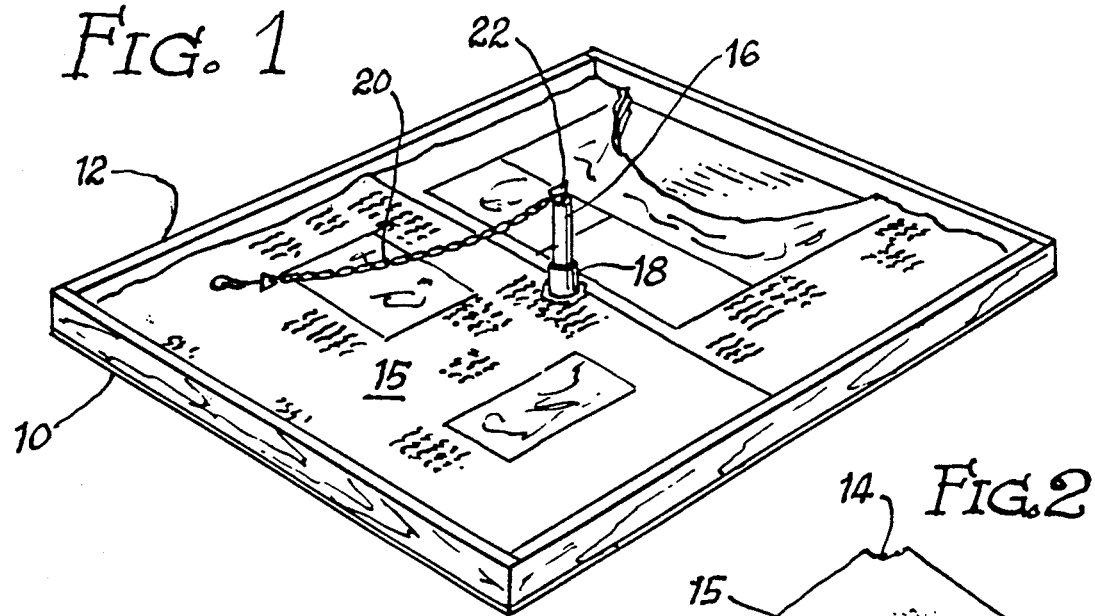
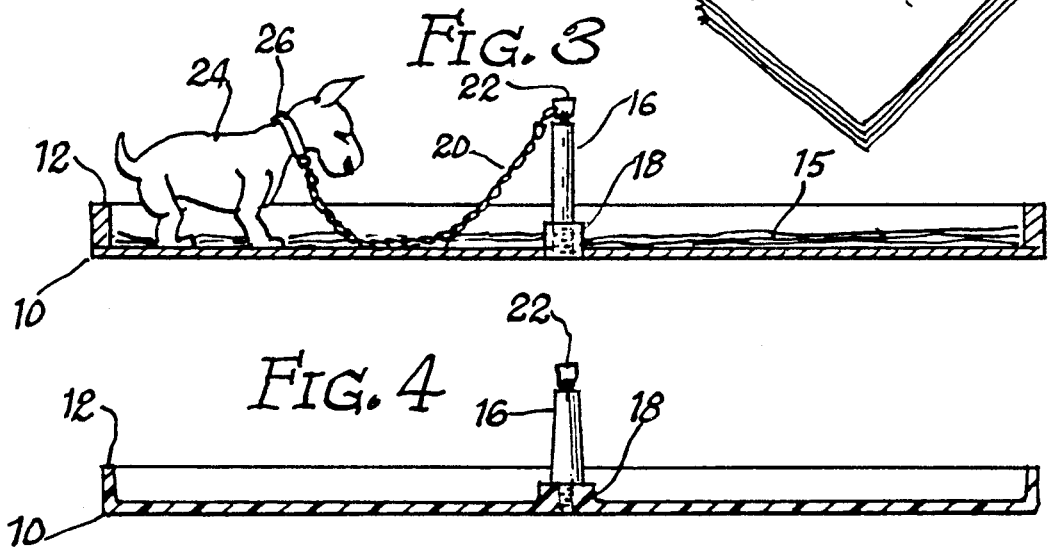
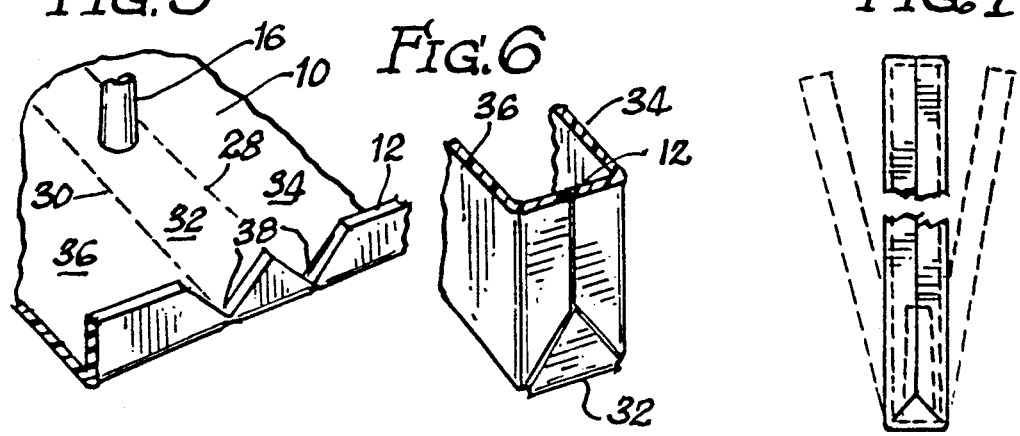

PET TRAINER

BACKGROUND OF THE INVENTION

As the civilized world becomes urbanized at an alarmingly accelerated rate, the care and training of pets, especially dogs, assumes a new dimension. Whereas in a rural society, a family would typically have several children and at least one large dog which runs free on the property, obviously the dog must face certain constraints when moved to the city.

Urbanization has apparently done nothing to dampen the zeal of pet owners. People who have pets generally will conform their lifestyle and circumstances around the pet rather than do without it. This generally includes spending many hours, searching far and wide, for a rental house or apartment which will accept pets. When walking the pet, many, and probably most, large cities have ordinances imposing a large fine on pet owners who fail to pick up their pets, droppings from city streets while walking it.

Obviously, the reason most landlords are reluctant to have pets, and in particular dogs, live in and on their property is the fact that they are rarely 100% housebroken. Although eliminating the fleas once the dog has moved out is an achievable task, the main problem lies in cleaning the carpet, which has been the victim of numerous little accidents that the dog has had over the months or years it has inhabited the house. Typically, the odor emitted by the rug, and sometimes its stained appearance, either requires that the rug be replaced, or at the very least makes it difficult for the landlord to re-rent the property.

The pet problem has become increasingly critical due to the relegation of many people to smaller and smaller urban quarters and the increasing reluctance of landlords to accept pets. There is an increasing need for techniques and devices to effectively train pets and particularly dogs to use a specific and restricted area as a bathroom rather than the entire carpet. It is true that there are cat boxes for cats, and dog owners generally put down newspapers and spank the dog and "rub his nose in it" when he relieves himself in the wrong place. The latter may be effective when done often enough and consistently enough, and providing the dog is caught immediately after committing the offending deed. However, in the real world this is rarely possible.

There is a need, therefore, for a system and a device which would automatically train the dog to relieve itself on a newspaper area specifically set aside for such purpose.

SUMMARY OF THE INVENTION

The instant invention fulfills the above stated need. It comprises a flat panel having a raised peripheral lip, which is just the right size to receive an outfolded newspaper with a hole punched in the middle. A newspaper folded in quarters can have its inside corner torn off, defining a perfectly centered hole which will slip over a center post which extends upright from the center of the panel. Once the newspaper is flipped over the post and onto the panel, a pet (generally a dog) tether or leash attached to the top of the post is then attached to the animals' collar.

The dog can then travel no further then the confines of the pet trainer. The dog is left there until it relieves itself, at which point it is released. Ordinarily the dog is tethered to the device at a particular time of day and left there until it is finished. For example, an owner may be used to taking the dog for a walk around the neighborhood once or twice a day at the same time. The dog thus (hopefully) trains its bowels to move only during those times. At the same times, the owner can tether the dog to the newspaper walk, which would either train the dog initially to use newspaper or train it to use newspaper as an alternative to the neighborhood walks when walks are simply not possible.

BRIEF DESCRIPTION OF THE DRAWINGS

FIG. 1 is a perspective view of the dog trainer;

FIG. 2 illustrates a quartered newspaper with a corner torn out to be used as a cover for the trainer;

FIG. 3 illustrates the trainer with a newspaper in place and a dog tethered to the center post;

FIG. 4 is a section taken longitudinally through the center of the trainer;

FIG. 5 is a fragmentary perspective view of a modified version of the trainer in which it folds suitcase-like to conserve space;

FIG. 6 is a fragmentary perspective view of the folded corner of the modified trainer; and, FIG. 7 is an end elevation view illustrating the edge of the trainer as it would appear folded up.

DETAILED DESCRIPTION OF THE PREFERRED EMBODIMENTS

As shown in FIG. 1, the pet trainer consists of a wide, flat panel 10 and a continuous peripheral lip 12 which is exaggerated in height somewhat to facilitate illustration. In its simplest prototype form, the panel 10 could be made of plywood with the lip 12 made of wood strips. However, in the preferred embodiment for manufacturing it would be anticipated that it would be made of an elastomeric material similar to that from which other large plastic-like items are made such as garbage cans, dirty clothes hampers, dish drains and the like.

The area of the panel inside the lip 12 is preferably just large enough to receive a completely unfolded newspaper sheet. Ordinarily two or more sheets would be used. A standard newspaper when quartered as shown in FIG. 2, can have its corner torn out at 14 so that it fits over the post 16 which is screwed into the socket 18 in the center of the panel.

Once the newspaper is in place, and the tether 20 is attached to the swivel 22 on top of the post, the pet 24 is attached by means of his collar 26 to the distal end of the tether. The dog is then permitted to walk around the panel, but the tether is too short to permit him to do more than extend a leg or two beyond the lip at its closest point to the post. Therefore, the dog will stay on the panel until released.

FIG. 4 illustrates a section through the trainer made in an elastomeric material. Everything would be molded integrally as a single unit, except the post 16 which would ordinarily be a separate piece screwed into the socket 18 as illustrated. Alternatively the post could be made integrally with the rest of the panel, perhaps not being as tall as the one shown, and perhaps being tapered so that it would clear the mold.

A second embodiment shown in FIGS. 5-7 is identical in function to that illustrated in FIGS. 1-4, but collapses for transport. This would be very handy in small apartments or for people who travel with their pet. Whereas a panel the size of an outfolded newspaper sheet would be awkward to carry around when traveling, if folded to half the size, it would be no larger in planform dimension than a small suitcase.

In the preferred folded embodiment illustrated in FIGS. 5-7, the panel has two hinge lines at 28 and 30. If the unit is molded in an elastomeric material, these hinge lines would be defined most economically as "living hinges" which merely represent a narrowing of the material along the hinge line so that it will bend. The center post 16 is them mounted to the center strip 32 defined between the hinges, with the end pieces 34 and 36 defining the balance of the panel outside of the central strip 32.

The lip 12 is notched at 38, best shown in FIG. 5, so that when the unit is folded as shown in FIGS. 6 and 7, the neat, enclosed configuration illustrated in FIG. 6 is produced. The configuration of FIGS. 5 through 7 is ideal for a folding embodiment as it solves two design problems. First, if the panel were to fold in equal halves, the post or post socket would most conveniently be mounted to one of the halves, which would make it off-center. An off-center post would make newspaper puncturing trickier, and would cause obvious inefficiency in the tethering arrangement for the pet. Even if this problem were overcome, nonetheless when the two halves were folded together, they would have to hinge along the tops of the peripheral lip 12 and would thus leave a gap in one side of the device when folded. Although the gap would not necessarily be critical, it would obviously be less desirable when using the folded trainer to store things such as spare newspapers or other accessories.

Thus, in either of its embodiments the invention sets forth a simple and economical means of training a dog or other pet, and takes advantage of the generally standard size of newspapers and their ready availability as lining material. The invention provides a definite step, and a needed one, toward the increased urbanization and compartmentalization of living that society faces.

It is hereby claimed:

1. A pet trainer comprising:
   (a) flat panel;
   (b) a raised peripheral lip around said panel;
   (c) a tether mounted substantially centrally of said panel to connect to the collar of a pet;
   (d) said panel being of planform dimensions on the order of 23" by 27.5" which is substantially identical to the planform dimensions of an outfolded newspaper sheet such that an outfolded newspaper sheet will lie flat on said panel inside said peripheral lip.

2. A pet trainer according to claim 1 wherein said tether is mounted centrally of said panel on a raised post at least 3" tall, such that a newspaper when folded in quarters may have its inside corner removed to define a hole which will slip over said post.

3. A pet trainer comprising:
   (a) flat panel;
   (b) a raised peripheral lip around said panel;
   (c) a tether mounted substantially centrally of said panel to connect to the collar of a pet;
   (d) said panel comprising two substantially identical end pieces hinged to a center strip and including an upright post mounted centrally on said center strip, with said tether being attached to said post;
   (e) said peripheral lip being notched adjacent the junctures between said end pieces and said center strip such that said end pieces will fold together parallel defining a substantially continuous enclosure by said lip between end pieces, and said post extending from said center strip substantially parallely with said end pieces when same are folded together parallel.

4. Structure according to claim 3 wherein said end pieces, center strip and hinges connecting said end pieces and center strip are all molded as a single piece of elastomeric material.

5. A pet trainer comprising;
   (a) flat panel;
   (b) a raised peripheral lip around said panel;
   (c) a tether mounted substantially centrally of said panel to connect to the collar of a pet;
   (d) said panel being of planform dimensions on the order of 23" by 27.5" which is substantially identical to the planform dimensions of an outfolded newspaper sheet such that an outfolded newspaper sheet will lie flat on said panel inside said peripheral lip;
   (e) said peripheral lip being notched adjacent the junctures between said end pieces and said center strip such that said end pieces will fold together parallel defining a substantially continuous enclosure defined by said lip and said end pieces;
   (f) a post extending from said center strip substantially paralelly with said end pieces when same are folded together parallel, with said tether being mounted to the top of said post; and,
   (g) an outfolded newspaper of planform dimension on the order of 23" by 27.5" lying flat on said panel completely within said peripheral lip.

* * * * *